March 20, 1956   H. C. WINKEL   2,738,911
PRESSURE CONTROLLER FOR A GRID PASTING MACHINE
Filed Nov. 5, 1953
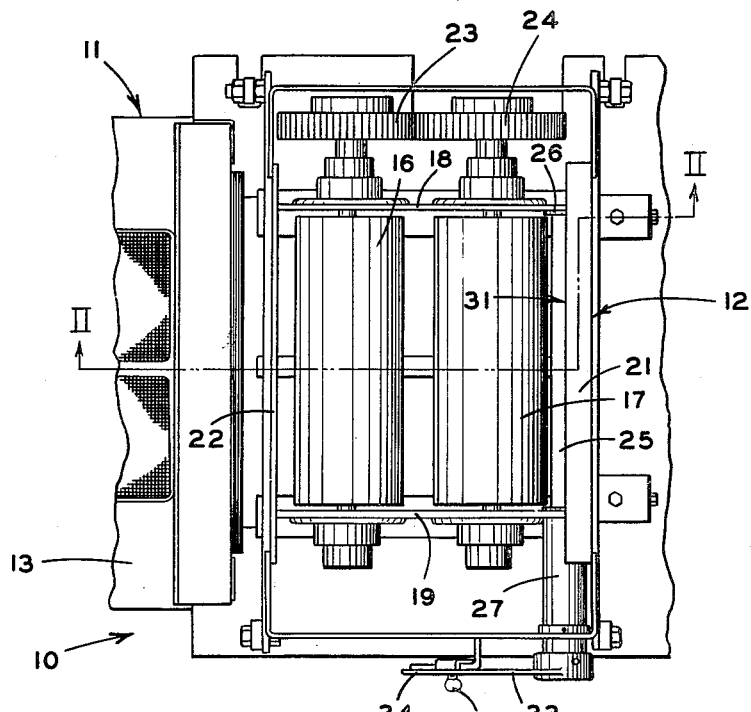
*fig. 1*
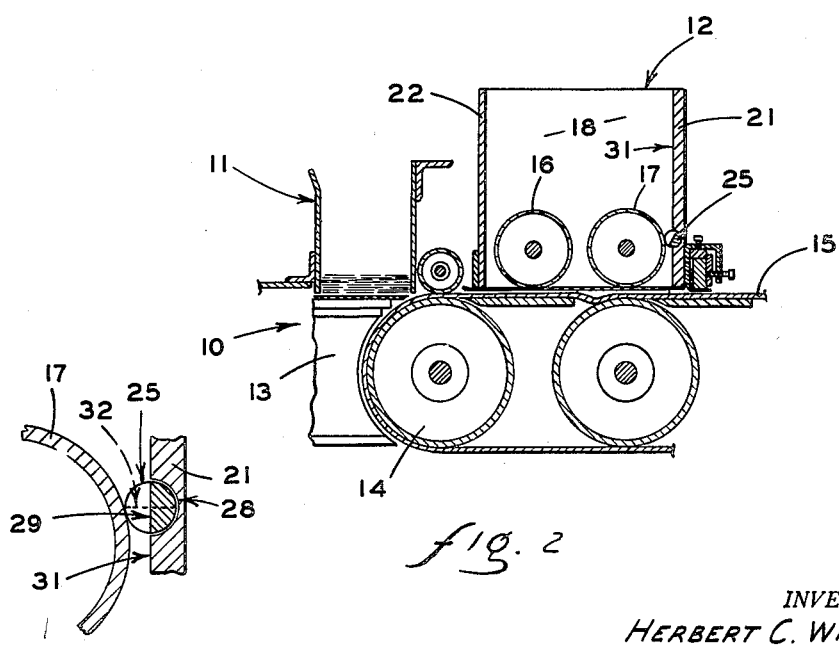
*fig. 2*
*fig. 3*
INVENTOR.
HERBERT C. WINKEL
BY
ATTORNEY

United States Patent Office 2,738,911
Patented Mar. 20, 1956

2,738,911

PRESSURE CONTROLLER FOR A GRID PASTING MACHINE

Herbert C. Winkel, Watervliet, Mich.

Application November 5, 1953, Serial No. 390,329

10 Claims. (Cl. 226—39.6)

This invention relates in general to a battery grid pasting machine and more particularly to a device for controlling the pressure under which paste is applied to battery grids by said machine.

In the design of automatically operating grid pasting machines, there is involved the problem of controlling the pressure at which said paste is applied to the battery plate grids. Different plates require different pressures for applying paste thereto and the consistency of the paste does not remain constant. Thus, the machine must compensate for these variations. Particularly, the consistency of the paste changes with atmospheric humidity, and even a very small change in such humidity may change the consistency of the paste quite materially. Hence, adjustment for such variation must be made frequently in order to effect application of paste to a grid in an accurately controllable amount.

The prior art has provided a variety of devices for this purpose, but insofar as I am acquainted with them, they have been either clumsy or inaccurate, or both. Therefore, it has long been highly desirable to provide an accurate, easily operated, and simple device for controlling the pressure and rate at which paste is applied to a plurality of battery plate grids.

Accordingly, a principal object of this invention is the provision of a device for controlling the pressure and rate at which paste is applied to battery plate grids, which device is highly accurate in its operation.

A further object of the invention is to provide a device, as aforesaid, which is easily operated.

A further object of the invention is to provide a device, as aforesaid, which is of sufficient structural simplicity that it can be adapted to a battery grid pasting machine with relatively little expense or difficulty, and can be maintained in operating condition with equally little expense.

A further object of the invention is to provide a pressure controlling device, as aforesaid, which can be readily installed into a variety of battery grid pasting machines without substantial modification thereof.

Other objects and purposes of the invention will be apparent to persons acquainted with devices of this general type upon reading the following specification and inspection of the accompanying drawings.

In the drawings:

Figure 1 is a top view of the hopper and one end of the conveyor of a machine for pasting battery plate grids.

Figure 2 is a section taken on the line II—II of Figure 1.

Figure 3 is a detail of Figure 2 showing the parts on an enlarged scale.

In general

In general, my improved device consists of an elongated, hemi-cylindrical gate, journaled at each of its ends upon the sides of the paste hopper of a grid pasting machine and provided with a suitable operating handle positioned outside of said hopper. Said hemi-cylindrical gate is partially recessed into one wall of the hopper connecting said two side walls and is substantially in opposed relationship with an adjacent one of the paste applying rollers. In an open position, the pressure controlling device will be completely, or substantially, recessed into said one wall and by rotation thereof it may be moved a predetermined distance into the space between said one wall and the said adjacent paste applying roller.

Construction

As shown in Figures 1 and 2, my invention concerns the leading end 10 of a grid pasting machine where the grid dispenser 11 and paste hopper 12 are located. For further details of a pasting machine of this general type and construction, reference is made to my pending application, Serial No. 103,634, filed July 8, 1949, now Patent No. 2,669,376, issued February 16, 1954, entitled Grid Pasting Machine.

The grid dispenser 11 is mounted upon a support platform 13 located adjacent to and slightly embracing the leading end pulley 14 around which a flat conveyor belt 15 passes. The paste hopper 12 is positioned closely above the conveyor 15 near the pulley 14 and is provided, in this particular embodiment, with a pair of adjacent, parallel paste rollers 16 and 17. Said paste rollers are transverse of, and spaced a short distance above, the conveyor belt 15 and are journaled at their opposite ends in the side walls 18 and 19 of the paste hopper 12. Said rollers 16 and 17 are spaced from each other and from the front and rear walls 21 and 22, respectively, with which said rollers are parallel. The rollers 16 and 17 are caused, as by means of the gears 23 and 24, connected thereto at the same ends thereof, to counter-rotate toward each other and downwardly between their adjacent surfaces. Thus, paste placed in the hopper 12 is urged downwardly between and by said rollers.

The gate 25 is herein comprised of a hemi-cylindrical bar extending from one side of the hopper 12 to the other side thereof and having cylindrical portions at its opposite ends. Said cylindrical portions are journaled in the bearings 26 and 27 located in the side walls 18 and 19, respectively. A hemicylindrical recess 28 is provided in the front wall 21 adjacent the front roller 17 and substantially parallel therewith, and is of substantially the same radius as the gate 25 for snugly and rotatably receiving same. Said recess 28 is of such radius that a cylindrical bar of the same radius and disposed therein would snugly engage the adjacent surface of the front roller 17, substantially as shown in Figure 3.

Thus, in one position of the gate 25, shown in solid lines in Figure 3, the flat surface 29 thereof is flush with the inner surface 31 of the front wall 21. In the dotted line position 32 of Figure 3, the gate 25 extends between the front wall 21 and the adjacent paste roller 17, thereby preventing passage of paste between the two.

The bearing 27 extends substantially sidewardly of the side wall 19 where it supports at its outer end a control handle 33 connected to said gate 25 for rotating same into any desired position. A quadrant 34 and clamp 35 secured to the control handle 33 permit affixing of the handle 33 in any desired position.

Operation

As indicated hereinabove, the gate 25 is operated by loosening the clamp 35 and moving the control handle 33, thereby rotating said gate 25 about its own axis into the desired position. Ordinarily, such rotation will not exceed a 90 degree movement from the solid line position 29 to the dotted line position 32 shown in Figure 3. In the solid line position, the gate 25 presents no obstruction to paste which has been moved under the roller 17 and is escaping upwardly into the hopper between roller 17 and adjacent surface of the front wall 21. If, however, circumstances such as high humidity necessitate greater pressure being imposed upon the paste being applied to a grid, the gate 25 is rotated from its solid line position to a position as shown in Figure 2, or the dotted line position in Figure 3. Such positioning of the gate 25 traps the paste in the forward lower corner of the hopper 12, thereby increasing the pressure with which it is applied to the grid passing between the roller 17 and the conveyor belt 15. When it is determined that the grids so passing under the hopper 12 are being provided with the proper amount of paste, the gate 25 is then locked into position by means of the clamp 35 and the process of applying paste to said grids may continue as long as the results appear satisfactory.

Thus, it is readily seen that the pressure with which the paste is applied to the grids passing under the roller 17 may be easily and quickly adjusted by my invention and its results immediately observed in the grids passing beyond the hopper on the conveyor belt 15.

Although the above description and accompanying drawings are directed to a particular preferred embodiment of my invention, it will be understood that modifications thereof clearly within the scope of the disclosure are fully contemplated unless specifically stated to the contrary in the appended claims.

I claim:

1. For use with a grid pasting machine having a hopper with spaced and substantially parallel side members and a forward member extending between and connecting said side members, said hopper having a plurality of paste applying rollers therewithin of which one is parallel with, and spaced from, said forward member, a paste pressure controlling device comprising in combination: an elongated gate; means associated with each end of said gate for rotatably supporting same in said side members and positioned between said forward member and said one of said rollers; said gate having a cut away portion formed therein in the portion of said gate which is positioned adjacent one of said rollers; and means for manually rotating said gate from a position where said gate blocks the space between said one roller and said forward member to a position where said cut away portion lies between said one roller and said forward member.

2. The apparatus of claim 1 in which a recess is provided in the wall of said forward member facing said one roller for the reception of said gate in the open position thereof.

3. The apparatus of claim 1 wherein one of the means rotatably supporting said gate member extends through its respective side member and a handle is secured to the end of said gate journaled therein.

4. For use with a grid pasting machine having a hopper with spaced and substantially parallel side members and a forward member extending between and connecting said side members, said hopper having a plurality of paste applying rollers therewithin of which one is parallel with, and spaced from, said forward member, a paste pressure controlling device comprising in combination: an elongated gate having cylindrical end portions and a hemicylindrical center portion with a flat side; means journaling said end portions in said side members adjacent said one roller, one end of said gate extending through its associated side member; a recess in that face of said forward member adjacent said one roller for receiving said center portion when its flat side is facing the center of said hopper, said flat side thereby becoming flush with said face of said forward member; a handle affixed to said extended end of said gate for manually rotating said gate.

5. In a device for controlling the pressure with which paste is applied to a battery grid in a grid pasting machine having a flat conveyor belt and a paste hopper disposed closely above said conveyor belt, said hopper having a pair of sidewalls and a front wall transverse to the course of said belt, the combination comprising: a roller within said hopper, the axis of said roller being parallel with said front wall and said belt, and said roller being spaced from said front wall; an elongated gate having a hemicylindrical portion intermediate its ends and substantially equal in length to said roller; a hemicylindrical recess in that face of said front wall adjacent to said roller, the radius of said gate being slightly less than the radius of said recess and equal to the distance between the axis of said recess and the closest point on said roller, the axes of said recess and gate being coincident and parallel with the axis of said roller; and journal means rotatably supporting the ends of said gate in said sidewalls.

6. In a device for controlling the pressure with which paste is applied to a battery grid in a grid pasting machine having a flat conveyor belt and a paste hopper disposed closely above said conveyor belt, said hopper having a pair of sidewalls and a front wall transverse to the course of said belt, the combination comprising: a roller within said hopper, the axis of said roller being parallel with said front wall and said belt, and said roller being spaced from said front wall; an elongated gate having cylindrical end portions and a hemicylindrical center portion substantially equal in length to said roller, said center portion having a diametrically disposed, flat surface; a hemicylindrical recess in that face of said front wall adjacent to said roller, the radius of said gate being slightly less than the radius of said recess and equal to the distance between the axis of said recess and the closest point on said roller, the axes of said recess and gate being coincident and parallel with the axis of said roller; and journal means rotatably supporting said gate end portions in said sidewalls, said flat surface being flush with said front wall face in one position of said gate, and completely closing the space between said roller and said front wall in another position of said gate.

7. The structure of claim 6 in which an actuator is secured to said gate at one end thereof for rotating same, and means is provided for locking said actuator, hence said gate, in a particular position.

8. The structure of claim 6 in which an actuator is secured to said gate at one end thereof for rotating same, said gate being moved from said flush position to said closed position by movement of said actuator through an arc of about 90 degrees.

9. The structure of claim 6 in which the axis of said recess is spaced slightly above the horizontal plane through the axis of said roller.

10. The structure of claim 6 in which the axis of said recess is located between a horizontal plane passing through the axis of said roller and a horizontal plane tangent to the upper surface of said roller.

References Cited in the file of this patent

UNITED STATES PATENTS

| | | |
|---|---|---|
| 2,641,220 | Weber et al. | June 9, 1953 |
| 2,669,376 | Winkel | Feb. 16, 1954 |
| 2,680,547 | Donath | June 8, 1954 |